United States Patent [19]

Meier et al.

[11] Patent Number: 5,933,639

[45] Date of Patent: Aug. 3, 1999

[54] SYSTEM AND METHOD FOR DEBUGGING DISTRIBUTED PROGRAMS

[75] Inventors: Michael Stephen Meier, Newark, Calif.; Kevan Lee Miller, Danbury, Conn.; Donald Philip Pazel, Montrose; Josyula Ramachandra Rao, Briarcliff Manor, both of N.Y.; James Robert Russell, Stamford, Conn.

[73] Assignee: International Business Machines Corporation, Armonk, N.Y.

[21] Appl. No.: 08/650,926

[22] Filed: May 17, 1996

[51] Int. Cl.[6] ................................................. G06F 15/20
[52] U.S. Cl. ........................... 395/704; 395/680; 395/684
[58] Field of Search ..................................... 395/700, 183, 395/704, 684, 680; 364/300; 371/19

[56] References Cited

U.S. PATENT DOCUMENTS

| | | | |
|---|---|---|---|
| 4,589,068 | 5/1986 | Heinen, Jr. | 364/300 |
| 4,953,096 | 8/1990 | Wachi et al. | |
| 5,361,352 | 11/1994 | Iwasawa et al. | 395/700 |
| 5,371,746 | 12/1994 | Yamashita et al. | 371/19 |
| 5,533,192 | 7/1996 | Hawley et al. | 395/183.04 |
| 5,544,310 | 8/1996 | Forman et al. | 395/183.07 |

OTHER PUBLICATIONS

T. Bemmerl et al., "On–Line Distributed Debugging on Scalable Multiprocessor Architectures" Future Generation Computer Systems 11 (1995) pp. 375–385.

R.S. Side et al., "A Debugger for Distributed Programs", Software–Practice & Experience, vol. 24(5), pp. 507–525 (May, 1994).

Primary Examiner—James P. Trammell
Assistant Examiner—Matthew Smithers
Attorney, Agent, or Firm—Scully, Scott, Murphy & Presser; Jay P. Sbrollini

[57] ABSTRACT

This invention provides a small and efficient set of primitives for debugging a distributed application that runs on a plurality of processors connected by a common network. These primitives permit a user to debug a distributed application in a manner similar to debugging a non-distributed application. The invention allows a user to step into and return from a remote procedure call in exactly the same manner as a local procedure call. The invention also allow a user to set breakpoints in a server for specific clients and to specify conditions under which a particular remote call from a client should trap in a server. These capabilities greatly simplify the process of debugging distributed applications such as client-server programs.

14 Claims, 10 Drawing Sheets

SYSTEM AND METHOD FOR DEBUGGING DISTRIBUTED PROGRAMS

BACKGROUND OF THE INVENTION a. Field of the Invention

The present invention relates to distributed computer systems. More specifically, it relates to a systems and methods for finding and eliminating errors in the user programs of a distributed application.

b. Related Art

In the last two decades, parallel computing has emerged as a formidable and viable programming paradigm in its own right. The emergence can be attributed to two main factors. Firstly, parallel computing provides a mechanism for speeding up computations. Secondly, using multiple computing units enables one to take advantage of resources that may not be available on a particular machine.

One of the manifestations of parallel computing is in the form of a number of processing elements each possessing its own memory and being connected to a common communication network. Programs that run on such a multiplicity of machines are called distributed applications. Various technologies, called middleware, have emerged to enable and enhance distributed programming. Writing such programs can be a difficult and error-prone task. Detecting, locating and eliminating errors in these programs can be a costly and time-consuming process.

The mechanisms for distributed application error detection and resolution in use today, typically require a programmer to use single process debuggers, such as ipmd, dbx and gdb, to control the execution of each of the components of the distributed application, while laboriously controlling their relative speeds of execution and keeping track of the interactions between the various components. This approach is unsatisfactory for a number of reasons. Depending on the relative speeds of execution of the different components and the time taken for messages to traverse the communication network, a distributed application can give rise to a number of execution sequences. Only a few of these execution sequences need be erroneous. The chances of the programmer reproducing the same erroneous execution sequence are small. Also, in order to replay the erroneous execution sequence, the programmer may need to remember or manually record large amounts of information.

There have been several proposals and attempts to provide improved solutions to distributed application error detection and resolution. One approach is to collect information during the execution of the distributed application so as to reconstruct the sequence of global states of the program. The sequence of states is then inspected by a separate process to find the error. A problem with such schemes is that they are inefficient inasmuch as they require a large quantity of information to be recorded and collected in a centralized process. Further, such schemes do not easily scale as the number of components in the distributed application increases.

Another approach is to log the relative order of events that have occurred in the execution, thus enabling the user to replay the same execution. The success of this scheme rests on the ability to log the factors that influence the order of events in the execution. This approach too, does not scale as the number of components in the application and the number of interactions increase.

SUMMARY OF THE INVENTION

In light of the forgoing, the present invention provides a system and method for debugging a distributed program.

In accordance with a first aspect of the present invention, a system which will execute the distributed program is provided with user specified data identifying an operation and a first process. In performing the operation, the first process sends a particular message to the second process. In response to the particular message being received by the second process from the first process, an indication is provided to the user that the particular operation is to be executed.

In accordance with second aspect of the present invention a system which will execute a distributed program is provided with user specified data identifying an operation and a first process. In concluding the operation, a particular message is send from the first process to a second process. The user is provided an indication that the operation was initiated by the first process and has concluded. The second process uses the contents of the message to determines whether to continue execution.

In accordance with a third aspect of the present invention a distributed debugger is provided with data identifying a first process, an operation in the first process, a list including a name of another process associated with the operation. The user is provided with an indication that the operation was performed in response to a request from a process whose name was on the list and an identification of the process which initiated the operation.

In accordance with a fourth aspect of the present invention a system which will execute a distributed program is provided with user specified data identifying an operation, a first process and a list of names identifying at least one other process. In performing the operation, the first process sends a particular message to the second process. The system then determines whether the second process is identified in the list of names. Only when the second process is in the list of names, the system provides an indication to the user that the particular operation is to be executed by the second process in response to the particular message being received by the second process from the first process.

DETAILED DESCRIPTION OF THE PREFERRED EMBODIMENT

The embodiments of this invention will now be described in detail with reference to the drawings.

Figure 1:
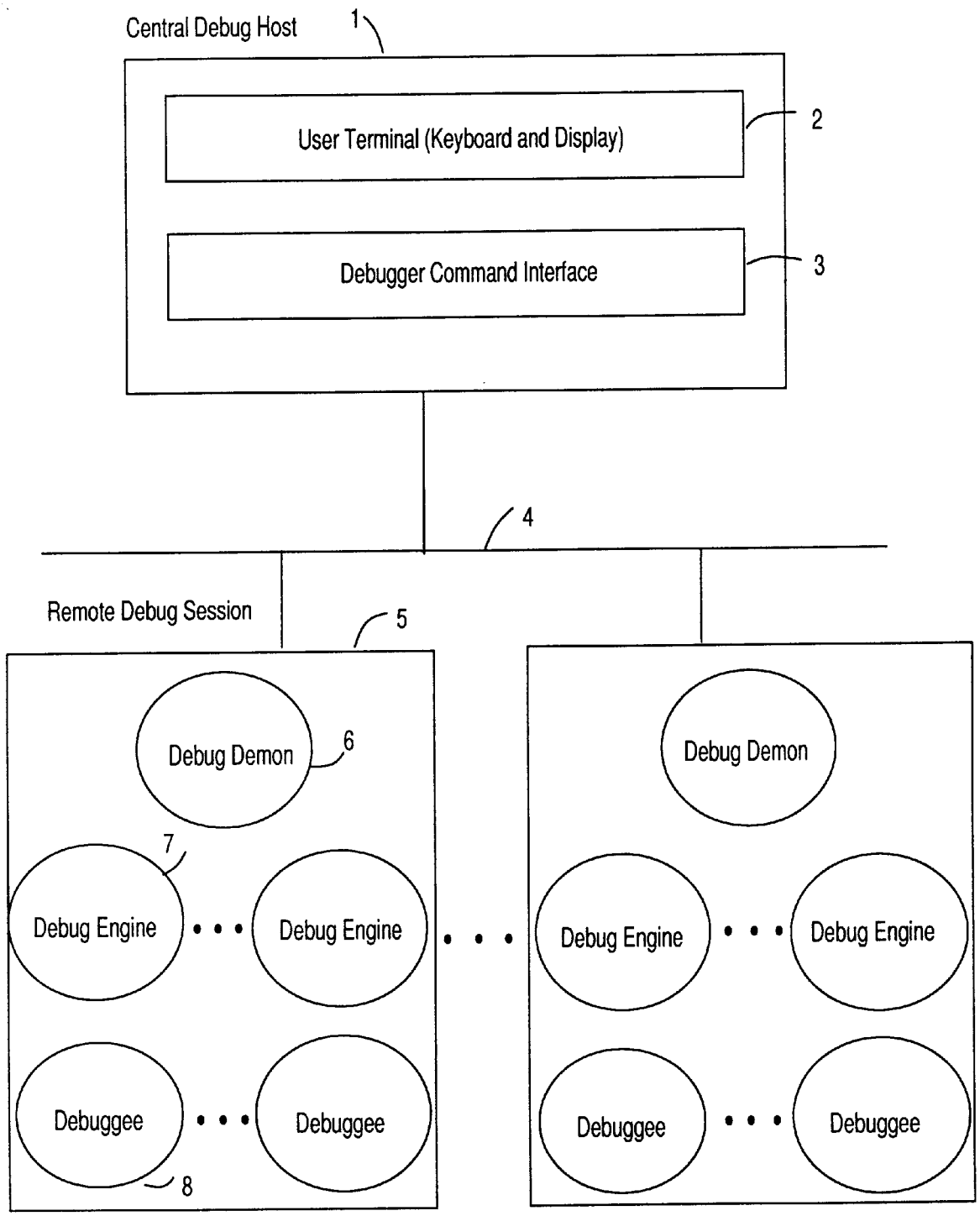
FIG. 1 is a schematic block diagram showing the components of a debug session.

FIG. 1 shows the components of a Distributed Debug Session. A Central Debug Host 1 is connected to one or more Remote Debug Hosts 5 via a communication network 4 (eg. TCP/IP). The Central Debug Host 1 includes a User Terminal 2 and a Distributed Debugger Front-End 3. The User Terminal (user display and input devices) provides a means for a user to control and view the state of the Distributed Application which is being debugged. The Distributed Debugger Front-End provides the program logic needed to control and display the state of the Distributed Debug Session.

There can multiple Remote Debug Hosts 5. Each Remote Debug Host 5 contains one Debug demon (daemon) 6, one or more Debug Engines 7 and Debuggees 8. The Debug demon starts Debug Engines on Remote Debug Hosts. The Debug demon accepts debug control commands sent by the Distributed Debugger Front-End using the communications network. These debug control commands cause the Debug demon to start a new Debug Engine.

A Debug Engine either attaches to an existing Debuggee or creates a new Debuggee and attaches to it. In either case, the Debug Engine is able to control the execution and state of the Debuggee.

Although not shown, a Debug demon, Debug Engine, and Debuggee can exist on the Central Debug Host. This allows the Central Debug Host to be part of the Distributed Application and it allows the Central Debug Host to be a Remote Debug Host as well. The Debug demon, Debug Engine, and Debuggee are controlled by the Distributed Debugger Front-End, just as a Debug demon, Debug Engine and Debuggees in Remote Debug Hosts are controlled. The difference being that instead of the communication network being used to convey commands and state between the Distributed Debugger Front-End and the Debug Engine, a communications mechanism internal to the Central Debug Host may be used to convey the commands and state.

Figure 2:
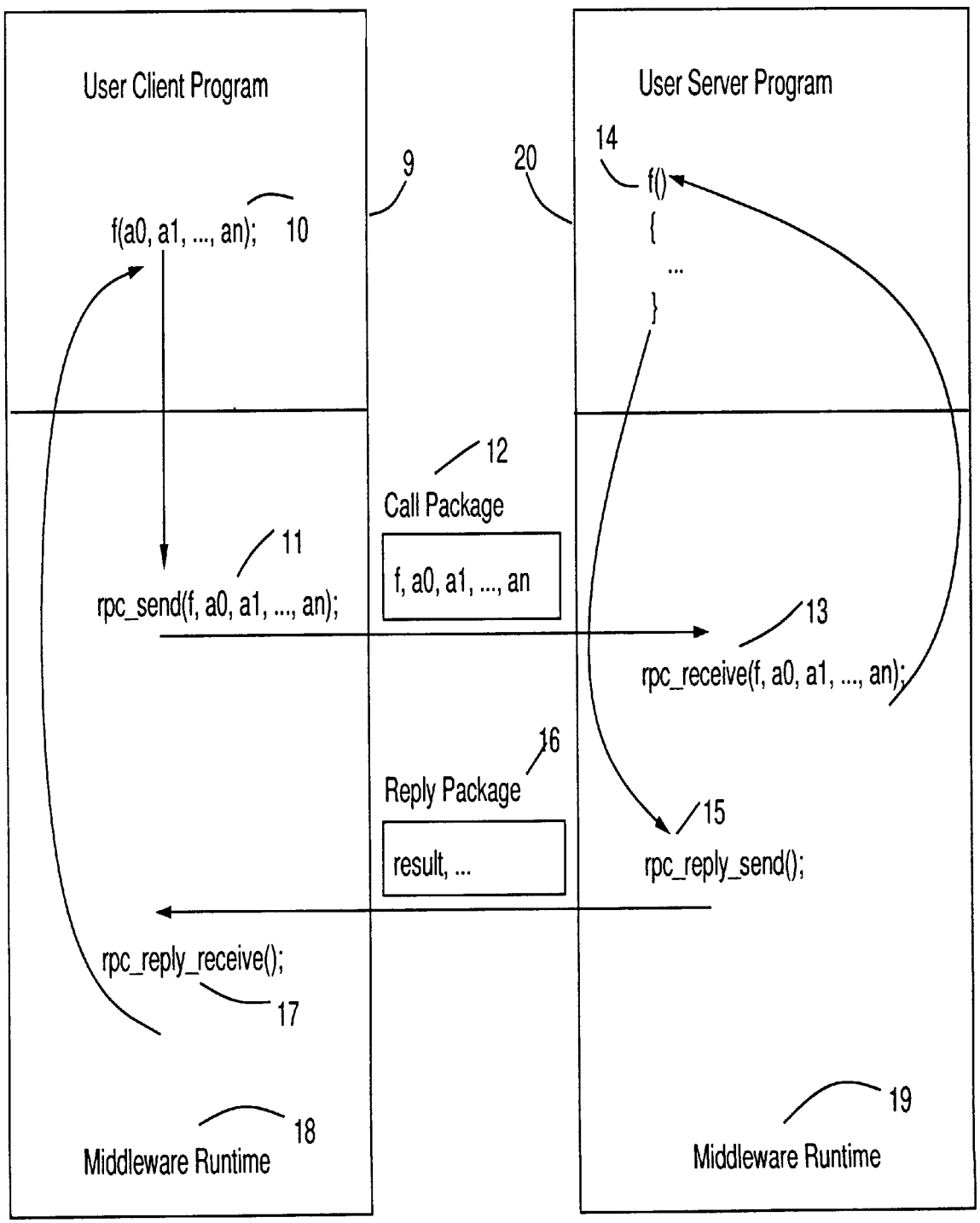
FIG. 2 depicts the flow of control during a remote procedure call, including the interactions between the user programs (client and server) and the middleware runtimes.

FIG. 2 shows a configuration of a distributed application using a Middleware to provide the distributed functionality of the application. The User Client Program 9 and the User Server Program 20 are parts of this Distributed Application. One portion of the User Client Program includes a call to a routine or method called f 10 with N arguments or parameters. Unlike a method call in a non-distributed application, this method invocation is not executed by the User Client Program. Instead the method call runs in the User Server Program.

The invocation of the method f by the User Client Program is translated by the Middleware Runtime 18 into a Remote Procedure Call Send 11 by the Middleware Runtime. The information associated with this Remote Procedure Call Send includes the method to be invoked and the parameters to the method. The Remote Procedure Call Send is formatted into a Call Package 12. This Call Package is sent to the User-Server Program via a communication network.

The Middleware Runtime 19 in the User Server Program receives the Call Package sent by the User Client Program and causes a Remote Procedure Call receive 13 processing to be invoked. The Remote Procedure Call processing translates the information received in the Call Package into an invocation of a function call f 14 in the User Server Program. After the function call to f has been completed, the results of the function call are translated by the Middleware Runtime into a Remote Procedure Call Reply Send 15. The Remote Procedure Call Reply formats the result of the call to function f into a Reply Package 16. This Reply Package is sent to the User Client Program using the communication network.

The Middleware Runtime in the User-Client Program receives the Reply Package from the User Server Program and invokes a Remote Procedure Call Reply receive function 17. This Remote Procedure Call Reply Receive function translates the result information in the Reply Package and returns this information to the User Client Program.

Figure 3:
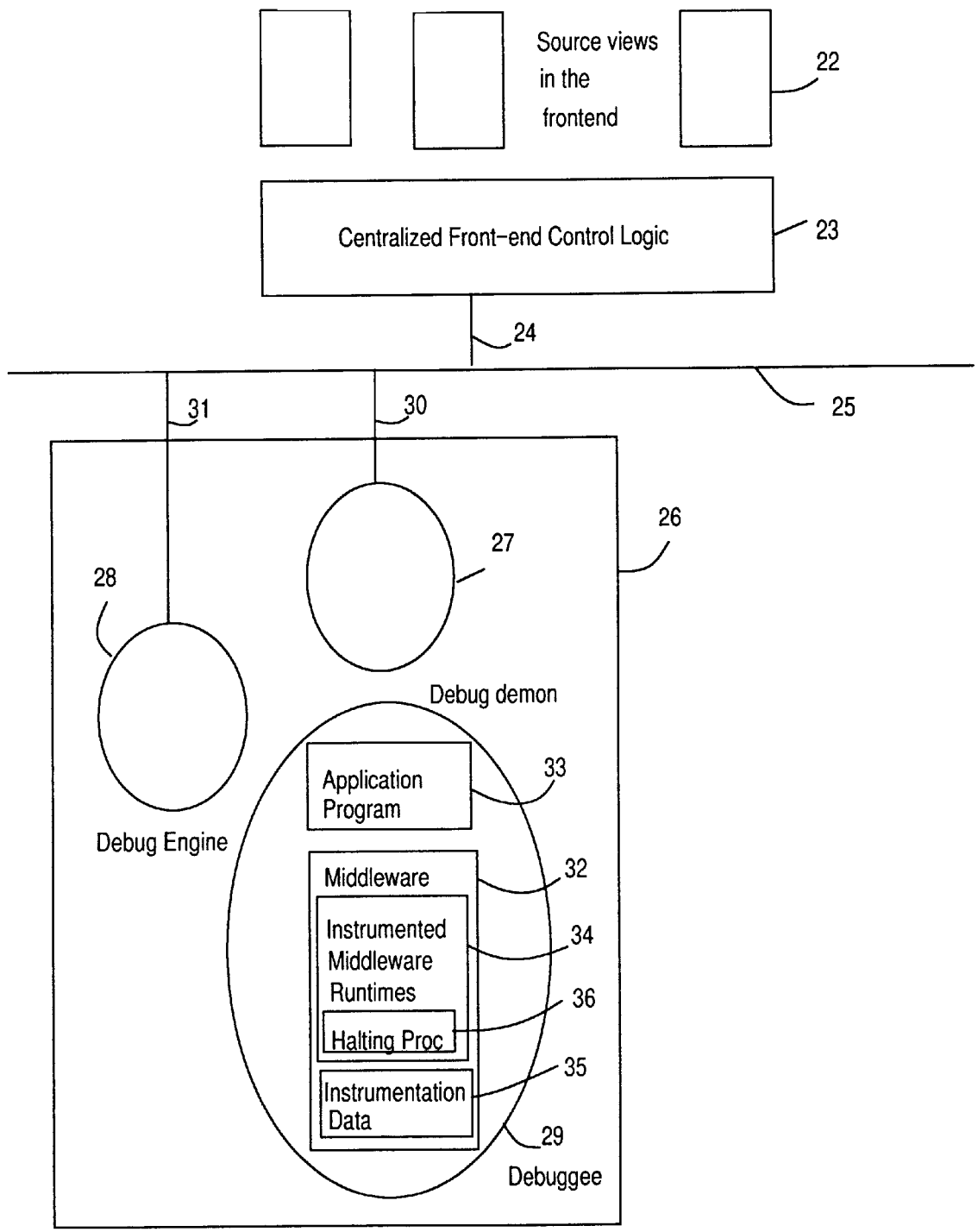
FIG. 3 is a block diagram of the components of a distributed debugger according to an embodiment of the present invention showing their relationship to a distributed application.

FIG. 3 shows the components of the distributed debugger and their relationship with the components of a distributed application, for the purpose of implementing the debugging primitives. The source views in the front-end 22 provide user debug information and input views of the debug user interface. The centralized front-end control logic 23 takes debugging commands from the views and transmits them to the appropriate debug engines. The debug control logic also receives reply and update information from the debug engines and uses it to update the user interface views. The debug control logic is attached 24 to a network 25 to accomplish these transmission.

On a given host machine 26, a debug demon 27 provides a means to launch debug engines 28 for debugging application processes 29, referred to as debuggees, on that host. The debug demon is attached to the network 30, and through that attachment intercepts commands from the debug control logic for initiating debugging a debuggee on that host.

After a debug engine 28 is launched it either attaches to the running debuggee 29, or if the debuggee does not already exist, launches it. The debug engine is capable of controlling the processing of the debuggee as is normal to any sequential debugger. The debug engine also attaches to the network 31 through which it receives debugging commands from the debug control logic and sends reply and update information back to the debug control logic.

In this context, the debuggee 29 is an application process which utilizes an inter-process remote procedure call (RPC) as implemented through a software package called middleware 32. The debuggee consists in part of an application program 33 which is custom programming (such as a payroll system or accounting package) to achieve the intent of the application. The application program utilizes the middleware for doing RPC. The middleware consists of an instrumented middleware runtime program 34 which actually embodies an implementation of RPC. The middleware runtime has been modified to enable distributed debugging primitives. The instrumentation data 35 is a memory data block which is utilized by the instrumented runtime and the debug engine as a means to share information for the distributed primitive implementation.

Part of the instrumented middleware is a "halting procedure" 36 which is a procedure which does no special processing but on whose first line a breakpoint is set by the debug engine when the debuggee is first debugged. The point behind the halting procedure is to provide a temporary point for stopping the debuggee in order for the debug engine to take further actions. This procedure is used by the server debuggees.

Figure 4:
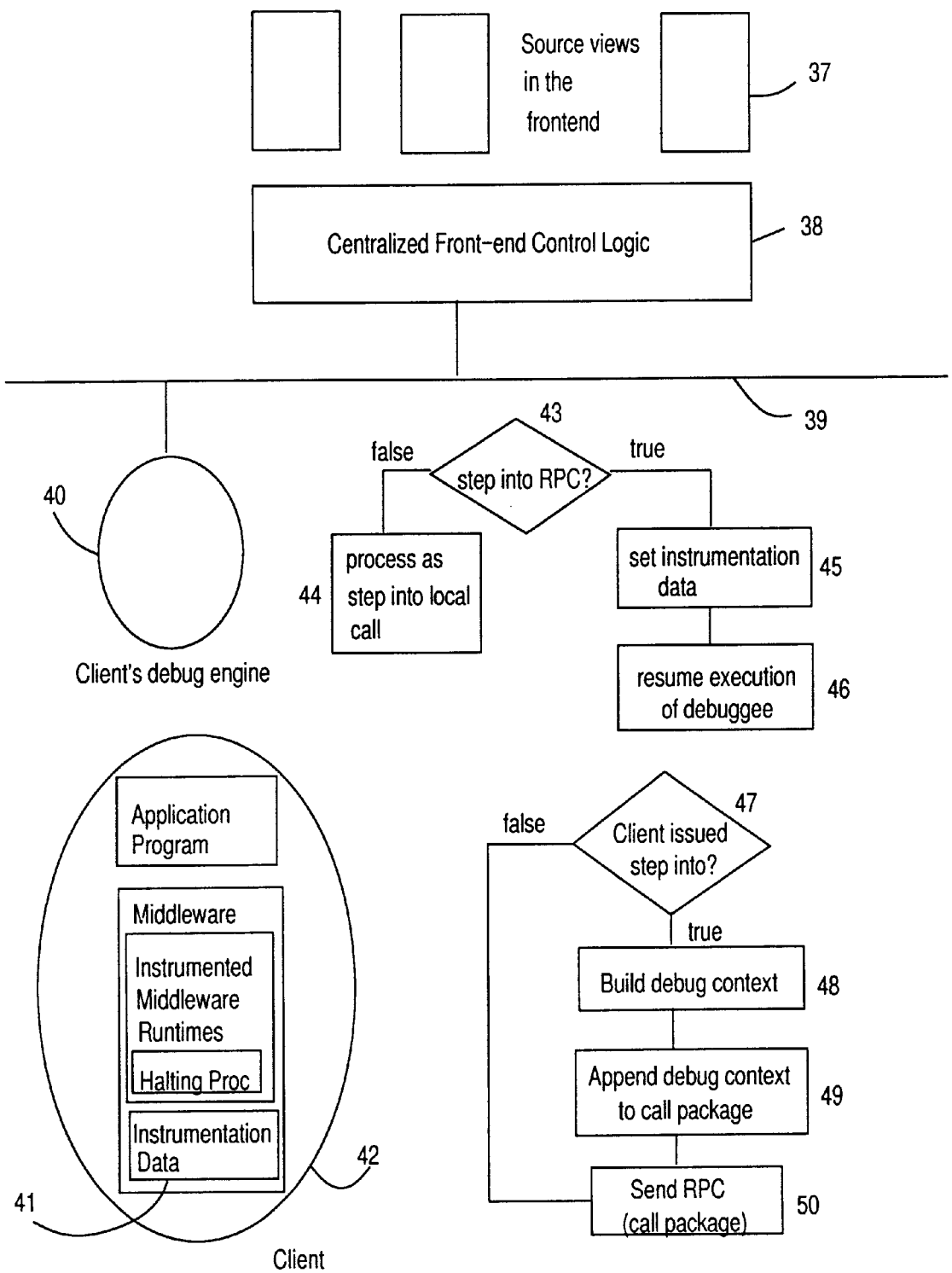
FIG. 4 depicts the flow of control for step-into-RPC in the client.

FIG. 4 details the procedure for step-into-RPC from the invocation of the RPC through sending of RPC data to the server. A debug step-into is issued from a debug view 37 on the user interface. This debug command is delivered to the centralized front-end control logic (also referred to as debug control logic) 38 who in turn sends the command to the debug engine 40 over a network 39. The debug engine next determines 43 if this "step-into" needs to be treated as a "step-into-RPC". This determination is dependent on the nature of the middleware, and involves identifying middleware programs and data and seeing if they are present in the current debuggee execution state. If this is not a "step-into-RPC", no special processing is necessary and the execution of this primitive proceeds as in normal sequential debugging 44.

If this is a "step-into-RPC", the debug engine accesses the instrumentation data 41 and sets the Client_step_into flag to trigger the middleware instrumentation for "step-into-RPC". The ID of the client is also set in the instrumentation data field 45. The debug engine then allows the debuggee application to run freely 46 through its sequential debugging command "go".

The debuggee 42 proceeds by checking 47 the Client_step_into flag on the instrumentation data 41. If it is false, the RPC call package is constructed as normal and sent 50 along the network to the server. If it is true, the RPC builds the debug context data 48 using the Client_ID field in the instrumentation data. This data is appended to the RPC call package 49 and sent 50 along the network to the server.

Figure 5:
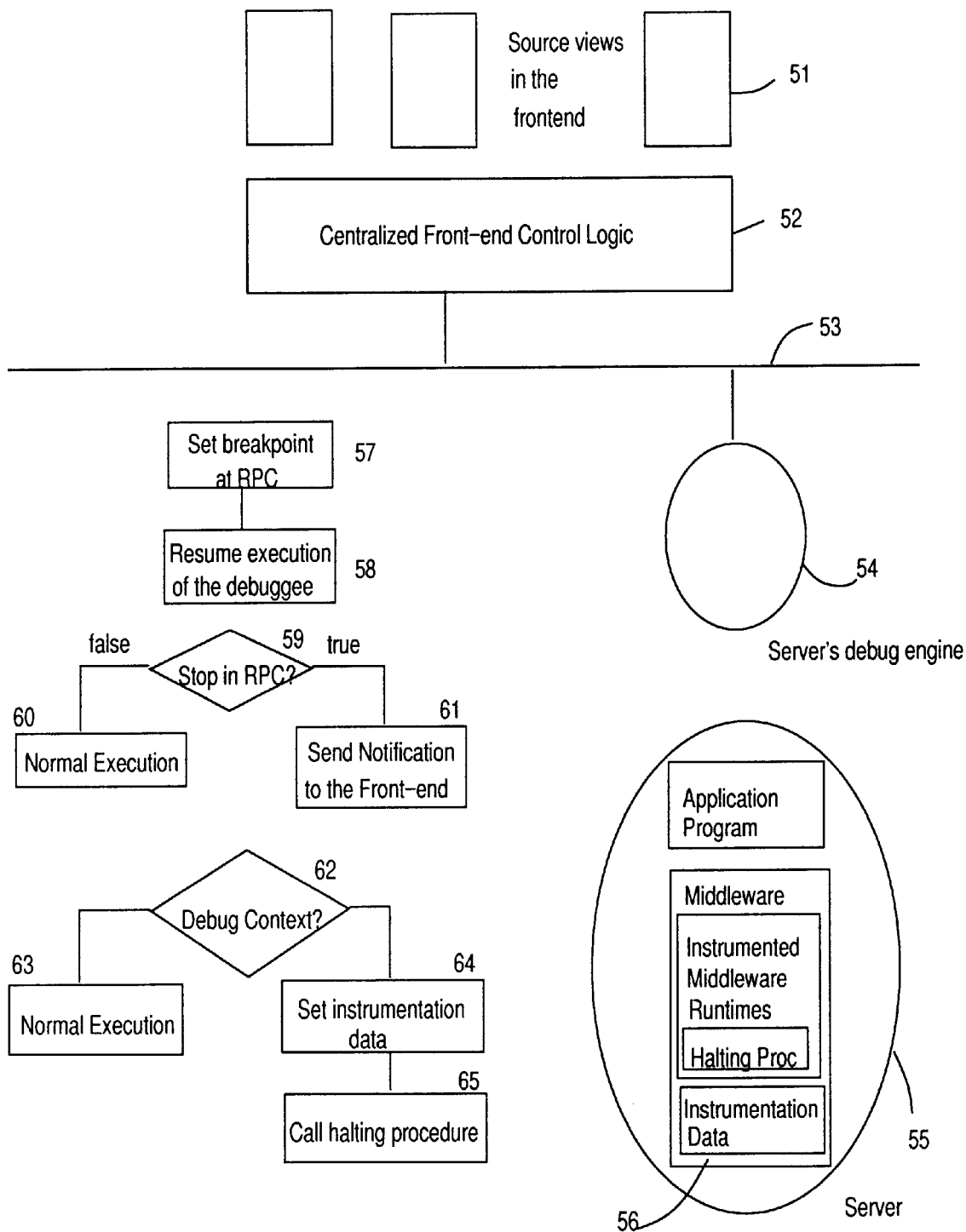
FIG. 5 depicts the flow of control for step-into-RPC in the server.

FIG. 5 details the procedure for step-into-RPC from the reception of an RPC call package by the server through the updating of the user interface of the debugger. After the RPC call package is received by the server debuggee 55, a check is made to determine if the package contains a debug context data 62. This is dependent on the middleware implementation, but usually is done by checking packet lengths or adding new flags to the packet definition indicating the existence of the debug context data. If there is no debug context data, process the RPC as normal for the middleware 63. If there is debug context data, the instrumentation data 56 is accessed and the Server_step_into flag is set 64. The Server_client_id field is set to the Client_ID value from the debug context 64. The entry point address of the RPC procedure is computed and put into the Server_RPC_address field 64. The Server_RPC_correlation_ID field is set to some middleware dependent value that will provide a means for the debug engine to identify the data in the instrumentation data as relevant data when execution eventually reaches the Server_RPC_address field 64. In many cases this is simply the execution thread id. The server then executes the halting procedure 65.

The server's debug engine 54 detects that the server is stopped at the halting procedure. This indicates to the server that it must read the instrumentation data 56 and set a breakpoint at the first line of the RPC indicated by the Server_RPC_address field 57. After doing that, the debug engine issues a "go" for the debuggee, continuing its execution 58.

The debuggee now executes until it reaches the first line of the RPC where it halts on the breakpoint 59. The debug engine uses the Server_RPC_correlation_ID to determine if this execution corresponds to the data in the instrumentation data 59. If not, the debug engine continues as normal 60. Otherwise, the debug engine sends a notification to the debug control logic 52 via the network 53 indicating that execution has stopped at the first line of an RPC as a result of a step-into-rpc from a client indicated by Client_ID. The debug control logic then updates the views accordingly 51.

Figure 6:
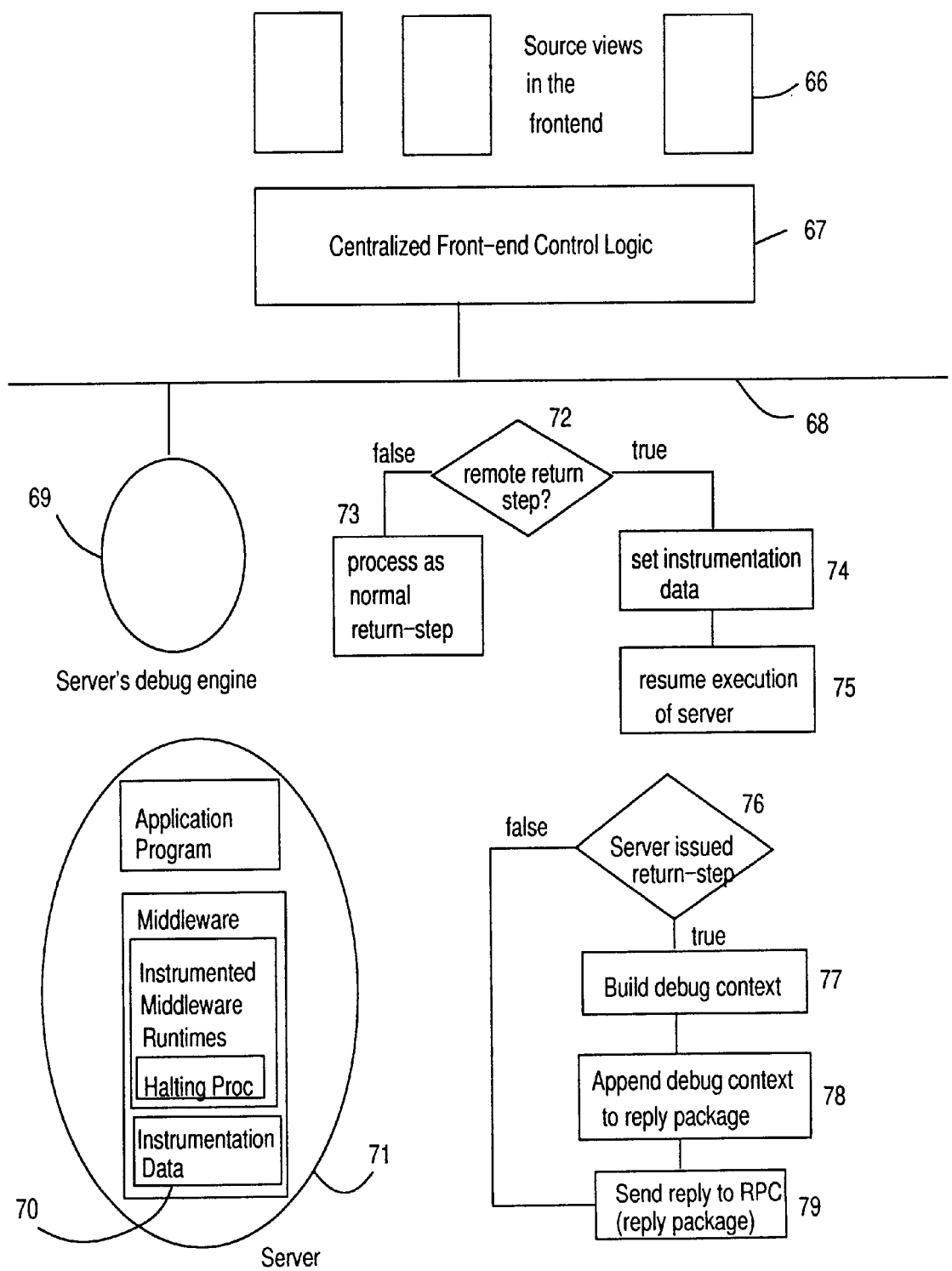
FIG. 6 depicts the flow of control for remote return-step in the server.

FIG. 6 details the procedure for remote step-return from the invocation of the step return from the server through the send of RPC reply data to the client. A debug step-return is issued from a debug view 66 on the user interface. A debug command is delivered to the debug control logic 67 who in turn sends the command to the server's debug engine 69 over a network 68. The debug engine next determines 72 if this "step-return" needs to be treated as a remote step-return. This determination is dependent on the nature of the middle-ware programs and data and seeing if they are present in the current debuggee execution state. If this is not a remote step-return, no special processing is necessary and the execution of this primitive proceeds as in normal sequential debugging 73.

If this is a remote step-return, the debug engine accesses the instrumentation data 70 and sets the Server_step_return flag to trigger the middleware instrumentation for remote step-return 74. The ID of the server is also set in the Server_ID field 74. The debug engine then allows the debuggee application to run freely 75 through its sequential debugging command "go".

The debuggee 71 proceeds by checking 76 the Server_step_return flag on the instrumentation data 70. If it is false, the RPC return reply package is constructed as normal and sent 79 to the client. If it is true, the RPC builds the debug context data 77 using the Server_ID field in the instrumentation data. This data is appended to the RPC call package 78 and sent 79 along the network to the server.

Figure 7:
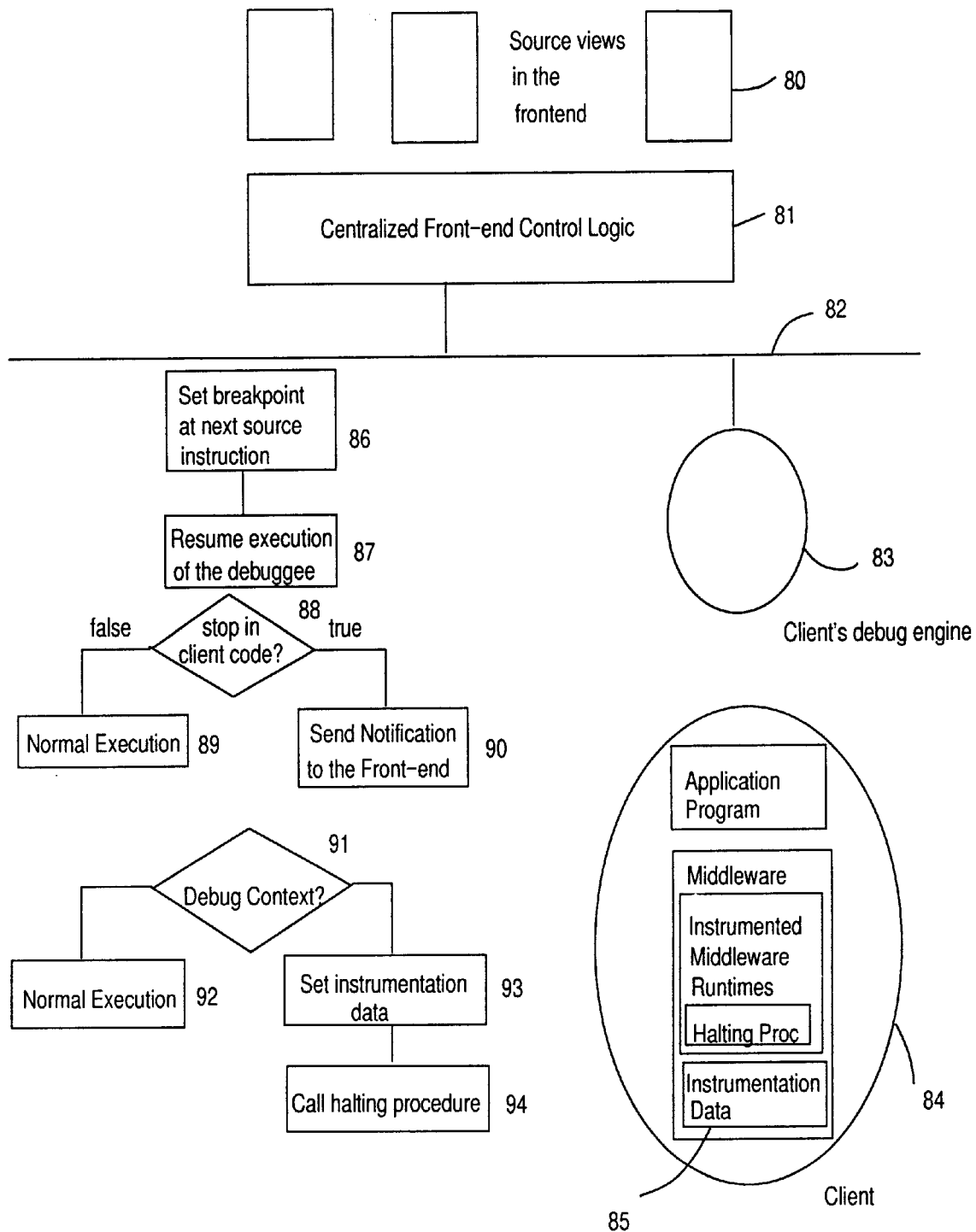
FIG. 7 depicts the flow of control for remote return-step in the client.

FIG. 7 details the procedure for remote step-return from the reception of the RPC call package by the client through the updating of the user interface of the debugger. After the RPC reply package is received by the client debuggee 84, a check is made to determine if the package contains a debug context data 91. This check is dependent on the middleware implementation, but usually is done by checking packet lengths or adding new flags to the packet definition indicating the existence of the debug context data. If there is no debug context data, process the reply RPC package as normal for the middleware 92. If there is debug context data, the instrumentation data 85 is accessed and the Client_step_return flag is set 93. The Client_server_id field is set to the Server_ID value from the debug context 93. The RPC return point address in the client program is computed and put into the Client_RPC_address field 93. The Client_RPC_correlation_ID field is set to some middleware dependent value that will provide a means for the debug engine to identify the values in the instrumentation data that are relevant when execution eventually reaches and stops at the address specified in Client_RPC_address. In many cases this is simply the execution thread ID of the thread that executed the original RPC. The client then executes the halting procedure 94.

The client's debug engine 83 detects that the client stopped at the halting procedure. This indicates to the client's debug engine that it must read the instrumentation data 85 and set a breakpoint at the address indicated by Client_RPC_address in the instrumentation data 86. The engine then resumes client debuggee execution 87.

The client debuggee executes until it reaches the return of the RPC where it halts on the breakpoint and transfers control back the client debug engine. The debug engine uses the Client_RPC_correlation_ID field to determine if the client execution halting corresponds to the data in the instrumentation data 85. If not, the debug engine takes no further action 89. Otherwise, the debug engine sends a notification to the debug control logic 81 via the network 82 indicating that execution has stopped at the return of the RPC as a result of a remote step-return from a server indicated by Server_ID in the instrumentation data. The debug control logic then updates the views accordingly 80.

Figure 8:
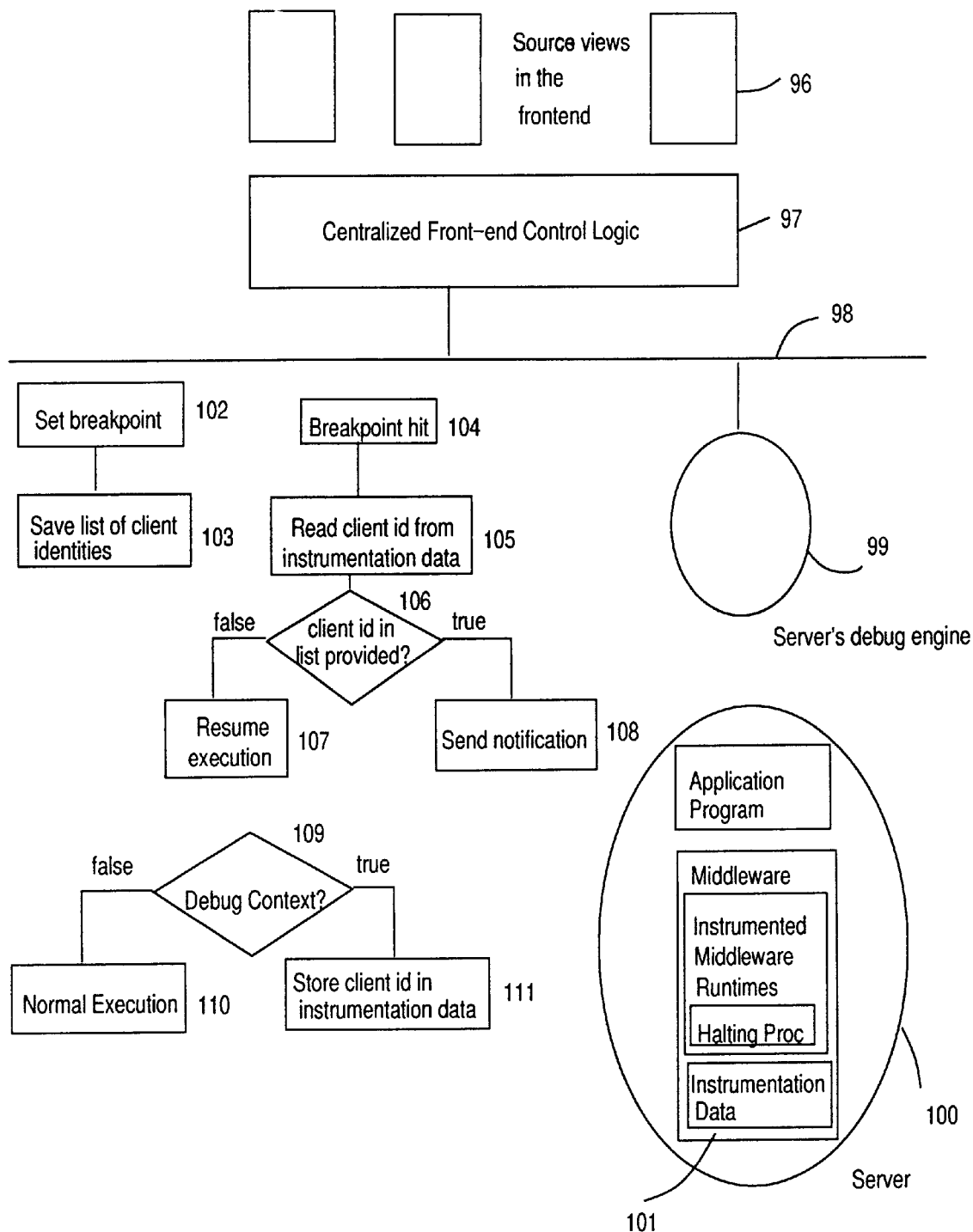
FIG. 8 depicts the flow of control for setting a client-specific breakpoint in a server.

FIG. 8 shows the procedure for a Client-Specific Breakpoint from the setting of a breakpoint through the notification of the user-interface. A Client-Specific breakpoint is issued from a Debug View 96. This command is delivered to the Centralized Front-end Control Logic 97 which in turn sends the command to the Server Debug Engine 99 using the communication network 98. The Debug Engine then 102 sets the breakpoint in the Debuggee and saves the list of clients to which this breakpoint applies 103.

After a call-package is received by the server debuggee 100, a check is made to determine if the call-package contains Debug Context data 109. If the call-package does not contain a Debug Context data 110, normal execution of the call-package is resumed. If the call-package does contain Debug Context data, the client-id is stored in the instrumentation data and normal execution of the call-package is resumed.

The debuggee now executes the call-package. If the breakpoint 104 is encountered, the Debug Engine reads the client id from the instrumentation data 105. If this client id is not in the list of clients sent in the Client-Specific Breakpoint, the Debug Engine causes the normal execution of the debuggee to resume 107. If the client id is in the Client-Specific Breakpoint list, the Debug Engine sends a notification to the Centralized Front-end Control Logic 97 using the communications network 98. This notification indicates that debuggee execution has been stopped because a client-specific breakpoint has been encountered. The id of the client is included in this notification and can be used to correlate the breakpoint in the server to the calling client.

Figure 9:
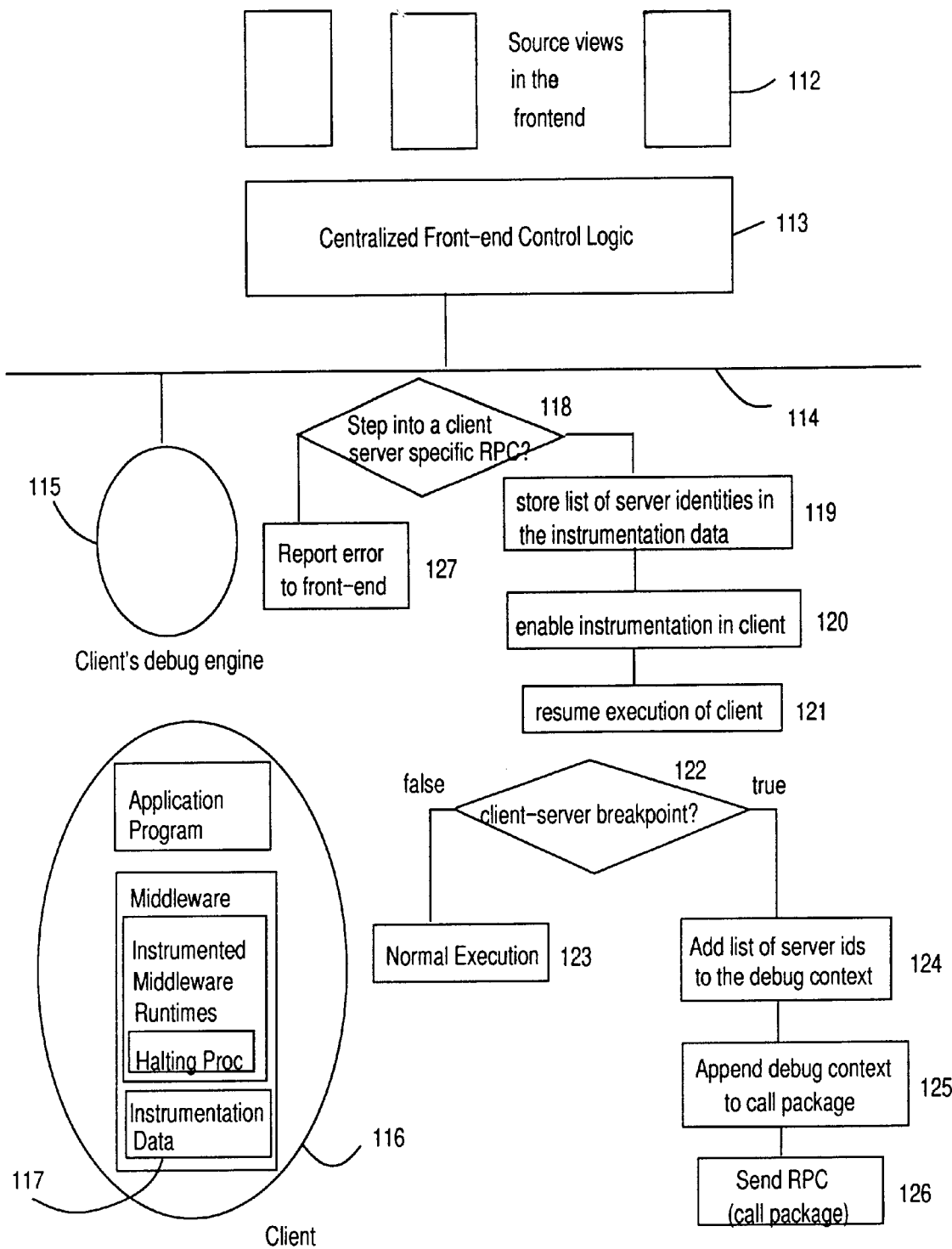
FIG. 9 depicts the flow of control in the client for stepping into a client-server-specific remote procedure call; and, FIG. 10 depicts the flow of control in the server for stepping into a client-server-specific remote procedure call.

FIG. 9 illustrates the procedure for Client Server-Specific Breakpoints from the setting of a Server-Specific Breakpoint through the sending of a call-package to a server. A Server-Specific breakpoint is issued from a Debug View 112. This command is delivered to the Centralized Front-end Control Logic 113 which in turn sends the command to the Client Debug Engine 115 using the communication network 114. The Client Debug Engine determines if this Server-Specific breakpoint will result in a "step-into RPC" 118. If this Server-Specific breakpoint will not result in a "step-into RPC" 127, an error is reported to the Centralized Front-end Control Logic via the communication network. If this Server-Specific Breakpoint does result in a "step-into RPC" 118, the list of servers included in the Server-Specific Breakpoint command is stored 119 in the Middleware Instrumentation Data 117. The Client Debug Engine then sets to true the Server_specific_breakpoint flag in the instrumentation data 120 and resumes execution of the Client Debuggee 121.

Figure 10:
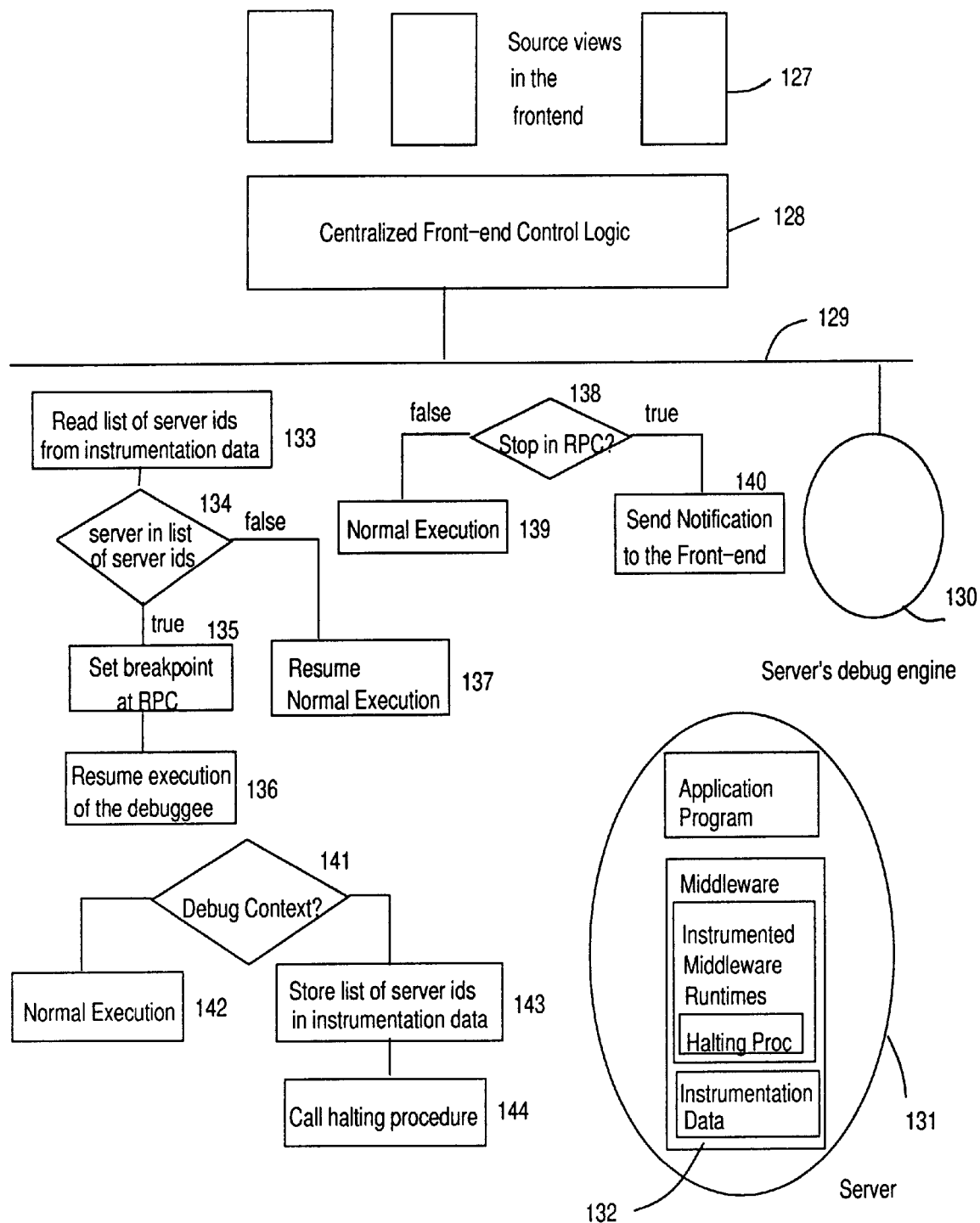

During the execution of the "step-into RPC" the debuggee Middleware checks 122 the Server_specific_breakpoint flag in the Middleware Instrumentation Data. If the Server_specific_breakpoint flag is false, normal execution of the "step-into RPC" is resumed 123. If the Server_specific_breakpoint is true, the Middleware adds the list of Server ids to the debug context 124. This debug context is appended to the call-package 125 and the call-package is sent to the server 126. FIG. 10 is a diagram illustrating the procedure for Client Server-Specific Breakpoints from the receipt of a call-package by a server through the notification of the user interface.

After a call-package is received by the Server Debuggee 131, a check is made by the Middleware to determine if the call-package contains Debug Context data 141. If the call-package does not contain Debug Context 142, normal execution of the call-package is resumed. If the call-package does contain Debug Context, the list of server ids in the instrumentation data is stored in the instrumentation data of the Middleware 143. The Middleware then invokes the Halting Procedure 144, causing the Debug Engine to be notified.

When the Server Debug Engine detects that the Server Debuggee is stopped in the Halting Procedure, the Debug Engine reads the list of server ids from the Instrumentation Data 133. The Debug Engine searches this list to see if the id of this server is included in the list of server ids 134. If the id of this server is not included in the list, the Server Debug Engine causes the execution of the Server Debuggee to resume normal execution 137. If the id of this server is included in the list of server ids, the Server Debug Engine sets a breakpoint at the entrypoint of the method which corresponds to the RPC 135 and resumes normal execution of the Server Debuggee.

When the breakpoint in the RPC method is encountered 138, the Debug Engine determines if this breakpoint was encountered as a result of a Client Server-Specific Breakpoint. If the breakpoint was not a result of a Client Server-Specific Breakpoint, normal breakpoint processing is resumed 139. If the breakpoint was a result of a Client Server-Specific Breakpoint, the Debug Engine Sends notification 140 to the Centralized Front-end Control Logic 128. This notification indicates that the Server Debuggee execution has been stopped because a Client Server-Specific breakpoint has been encountered. The id of the client is included in this notification and can be used to correlate the breakpoint in the server to the client.

A solution to the problem of scalability of distributed debuggers is to use the event trace monitor as a leveraging tool. The idea is to record all the RPC input and output of the sender and receiver. In this scenario, a replay debugger is invoked against one of the processes of the distributed application. This debugger would run the process, feeding the recorded RPC data into its RPCs. In this way, the debuggee process is effectively behaving as part of a virtual distributed application, and being debugged in isolation.

This notion can be extended to debug on-line systems as well. Assuming an errant on-line system, one could use the event trace monitor to selectively to record the RPC input and output for any number of processes. One could then use the replay debugger to investigate the errant behavior of any one process to locate the bug.

It should be understood that the present distributed debugger can be embodied as program code. AS previously discussed, copies of appropriate program modules of the distributed debugger are stored in the memories of each node of a distributed system. The program code for the distributed debugger can be provided to user in any suitable format, such as instantiated on a magnetic or optical storage medium or provided to the user by way of a network.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for debugging a distributed program including a first process and a second process, wherein the first process sends a message to the second process and wherein the second process uses the contents of the message to determine a next operation to execute, the method comprising the steps of:

providing a system which will execute the distributed program with user specified data identifying an operation and the first process;

in performing the operation, sending a particular message from the first process to the second process; and, providing an indication to the user that the particular operation is to be executed by the second process in response to the particular message being received by the second process from the first process.

2. The method of claim 1 comprising the further step of controlling the first process and the second process such that a user can debug the execution of the particular operation by the second process when the particular operation is executed in response to the particular message being received from the first process.

3. The method of claim 1 wherein the message is a remote procedure call.

4. A method for debugging a distributed program including a client process and a server process, wherein the client process sends a remote procedure call to the server process and wherein the server process performs a procedure in response to the remote procedure call, the method comprising the steps of:

providing a distributed debugger executing on a common distributed system with the distributed program with user specified data identifying a procedure call and the client process;

providing an indication to the user that the procedure is to be executed by the server process in response to the procedure call being received by the server process from the client process; and, commencing a debugging operation on the server process in response to the procedure call being received by the server process from the client process.

5. A method for debugging a distributed program including a first process and a second process, wherein the first process sends a message to the second process, the method comprising the steps of:

providing a system which will execute the distributed program with user specified data identifying an operation and the first process;

in concluding the operation, sending a particular message from the first process to the second process; and, providing an indication to the user that the operation was initiated by the first process and has concluded;

wherein the second process uses the contents of the message to determines whether to continue execution.

6. The method of claim 5 wherein the first process is a server process, the second process is a client process and the message is a reply to a remote procedure call.

7. The method of claim 5 comprising the further step of controlling the first process and the second process such that a user can debug the execution of the second process in response to conclusion of the operation by the first process.

8. A method for debugging a distributed program including a plurality of processes, the method comprising the steps of:

providing a distributed debugger with data identifying a first process, an operation in the first process, a list including a name of another process associated with the operation; and, providing an indication to the user that the operation was performed in response to a request from a process whose name was on the list and an identification of the process which initiated the operation.

9. The method of claim 8 wherein the operation is a breakpoint.

10. The method of claim 9 comprising the further step of prompting the user to take a further action with respect to continued execution of the first process.

11. The method of claim 8 wherein the first process is a server process, the another process is a client process and the operation is an instruction in a remote procedure call.

12. A method for debugging a distributed program including a first process and a second process, wherein the first process sends a message to the second process and wherein the second process uses the contents of the message to determine a next operation to execute, the method comprising the steps of:

providing a system which will execute the distributed program with user specified data identifying an operation, the first process and a list of names identifying at least one other process;

in performing the operation, sending a particular message from the first process to the second process; and, determining whether the second process is identified in the list of names; and, only when the second process is in the list of names, providing an indication to the user that the particular operation is to be executed by the second process in response to the particular message being received by the second process from the first process.

13. A method for debugging a distributed program including client process and a plurality of server processes, wherein a call from the client process can be sent to any of the server processes, the method comprising the steps of:

providing a system which will execute the distributed program with user specified data identifying the call, a client process and a list of names identifying at least one server process;

sending the call from the client process to any one of the server processes;

determining whether the server process receiving the call is identified in the list of names; and, only when the call was executed in response to the client process identified by the user by a server process is in the list of names, providing an indication to the user that the particular call is to be executed by the server process in response to the call being received by the server process from the client process.

14. The method of claim 13 comprising the further step of prompting the user to take a further action with respect to continued execution of the server process.

* * * * *